US011231215B2

(12) United States Patent
Matlack et al.

(10) Patent No.: US 11,231,215 B2
(45) Date of Patent: Jan. 25, 2022

(54) FLUID MATERIAL INJECTION DEVICE

(71) Applicant: Zynon Technologies, LLC, New Britain, CT (US)

(72) Inventors: Floyd Kent Matlack, North Granby, CT (US); Brian E. King, West Simsbury, CT (US); Adam Eckenroth, Terryville, CT (US); Jay S. Tourigny, Collinsville, CT (US)

(73) Assignee: ZYNON TECHNOLOGIES, LLC, New Britain, CT (US)

( * ) Notice: Subject to any disclaimer, the term of this patent is extended or adjusted under 35 U.S.C. 154(b) by 81 days.

(21) Appl. No.: 16/410,328

(22) Filed: May 13, 2019

(65) Prior Publication Data

US 2019/0353410 A1    Nov. 21, 2019

Related U.S. Application Data

(60) Provisional application No. 62/672,204, filed on May 16, 2018.

(51) Int. Cl.
*F25B 45/00*    (2006.01)
(52) U.S. Cl.
CPC ........ *F25B 45/00* (2013.01); *F25B 2345/001* (2013.01); *F25B 2345/006* (2013.01)
(58) Field of Classification Search
CPC ... F16L 55/164; F25B 45/00; F25B 2345/006; F25B 2345/001
(Continued)

(56) References Cited

U.S. PATENT DOCUMENTS 495,064 A  *  4/1893  Schrader ................ F16K 1/00
                                                  251/340
2,119,623 A  *  6/1938  Goff ..................... B60C 29/00
                                                  137/223
(Continued)

FOREIGN PATENT DOCUMENTS

EP    1637861 A1    3/2006
GB    1109899 A    4/1968
(Continued)

OTHER PUBLICATIONS

"Leak Saver Installation Method 3: One-Handed Installation" uploaded by LeakSavers Admin, Mar. 28, 2017 [retrieved on Feb. 6, 2019]. Retrieved from the Internet: https://www.youtube.com/watch?v=Avvw6b6-a9U&feature=youtu.be.
(Continued)

*Primary Examiner* — Timothy L Maust
*Assistant Examiner* — James R Hakomaki
(74) *Attorney, Agent, or Firm* — Cantor Colburn LLP

(57) ABSTRACT

An injection device (10) injects a dispensable fluid material (32), for example, a liquid sealant, into refrigerant lines of an air conditioning or refrigeration pressurized system, by utilizing the pressure difference between high and low pressure zones of the pressurized system. The device comprises a tube (12) which contains the dispensable fluid material (32) and is closed by an outlet valve (26). A movable member (34) houses a spring-loaded check valve (38) and is disposed downstream of and spaced from the outlet valve (26). The movable member (34) is movable within a passageway (24e) formed in an outlet tube connector (24). Upon being connected to a service port (17) of a pressurized system by an installation nut (28), movable member (34) is forced into engagement with the outlet valve
(Continued)

(26) to open it to dispense fluid material (32) into service port (17).

18 Claims, 3 Drawing Sheets

(58) Field of Classification Search
USPC .................................................. 141/346
See application file for complete search history.

(56) References Cited

U.S. PATENT DOCUMENTS

| | | | |
|---|---|---|---|
| 3,391,951 A | | 7/1968 | Miller |
| 3,424,181 A | | 1/1969 | Morse |
| 3,550,817 A | | 12/1970 | Babin |
| 3,592,439 A | * | 7/1971 | Ritchie, Jr. ............. F16K 15/20 |
| | | | 251/149.6 |
| 3,642,248 A | * | 2/1972 | Benware ................... F16K 3/12 |
| | | | 251/172 |
| 3,712,336 A | * | 1/1973 | Bell, Jr. ................. F16K 15/20 |
| | | | 137/613 |
| 3,747,626 A | * | 7/1973 | Valentino ................ F16K 15/18 |
| | | | 137/102 |
| 3,759,062 A | | 9/1973 | Wrenn et al. |
| 4,069,686 A | | 1/1978 | Hoelman |
| 5,070,917 A | | 12/1991 | Ferris et al. |
| 5,080,132 A | | 1/1992 | Manz et al. |
| 5,167,140 A | | 12/1992 | Cooper et al. |
| 5,248,125 A | * | 9/1993 | Fritch ..................... F16L 29/04 |
| | | | 137/614.02 |
| 5,582,202 A | | 12/1996 | Schultz et al. |
| 5,967,204 A | | 10/1999 | Ferris et al. |
| 5,975,151 A | | 11/1999 | Packo |
| 6,056,162 A | | 5/2000 | Leighley |
| 6,164,348 A | | 12/2000 | Rodwell et al. |
| 6,385,986 B1 | | 5/2002 | Ferris et al. |
| 6,539,970 B1 | * | 4/2003 | Knowles ............... B08B 9/0321 |
| | | | 137/15.04 |
| 6,561,237 B1 | * | 5/2003 | Brass ....................... F16L 29/02 |
| | | | 141/1 |
| 6,662,587 B2 | | 12/2003 | Rembold et al. |
| 6,851,442 B2 | * | 2/2005 | Knowles ................. F16L 37/30 |
| | | | 137/1 |
| 7,077,149 B2 | | 7/2006 | Kalley et al. |
| 7,296,423 B2 | | 11/2007 | Appler et al. |
| 8,852,200 B2 | | 10/2014 | Steffen et al. |
| 9,335,078 B1 | * | 5/2016 | Buggs, Sr. ............ F25B 41/003 |
| 9,709,307 B2 | | 7/2017 | Carrubba et al. |
| 9,733,229 B1 | * | 8/2017 | Tourigny ........... G01N 33/2888 |
| 10,288,333 B2 | * | 5/2019 | Carrubba ................ F25B 45/00 |
| 10,632,816 B2 | | 4/2020 | Cai et al. |
| 10,655,742 B2 | | 5/2020 | Tourigny |
| 2002/0189265 A1 | | 12/2002 | Ferris et al. |
| 2004/0124289 A1 | | 7/2004 | Yamamoto et al. |
| 2004/0168463 A1 | * | 9/2004 | Dudley ................... F25B 45/00 |
| | | | 62/292 |
| 2005/0061014 A1 | | 3/2005 | Cannan |
| 2005/0081914 A1 | * | 4/2005 | Kalley .................... F16L 29/02 |
| | | | 137/1 |
| 2008/0156002 A1 | * | 7/2008 | Willis ..................... C08G 77/20 |
| | | | 62/77 |
| 2008/0196789 A1 | | 8/2008 | Hartl |
| 2010/0180617 A1 | * | 7/2010 | Martin ................. F16L 55/1108 |
| | | | 62/259.1 |
| 2010/0282333 A1 | * | 11/2010 | Newman ................. F16K 1/306 |
| | | | 137/115.13 |
| 2011/0041522 A1 | | 2/2011 | Carrubba |
| 2013/0118187 A1 | | 5/2013 | Carrubba |
| 2014/0338385 A1 | * | 11/2014 | Ronga ..................... F25B 45/00 |
| | | | 62/292 |
| 2015/0285716 A1 | * | 10/2015 | Coleman ................ G01N 1/405 |
| | | | 73/864.63 |
| 2016/0178107 A1 | | 6/2016 | Cacciabeve et al. |
| 2016/0290694 A1 | * | 10/2016 | Pearl ................... B60H 1/00585 |
| 2016/0290695 A1 | | 10/2016 | Bi et al. |
| 2018/0029318 A1 | | 2/2018 | Franklin |
| 2018/0073647 A1 | * | 3/2018 | Prescott ................ F16K 15/183 |
| 2019/0093778 A1 | | 3/2019 | Tourigny |
| 2019/0128764 A1 | * | 5/2019 | Hoffman ................. F25B 45/00 |
| 2019/0290883 A1 | * | 9/2019 | Lippert ............. A61M 25/0051 |
| 2019/0338992 A1 | * | 11/2019 | Ronga .................... B67D 7/002 |
| 2020/0041060 A1 | * | 2/2020 | Pearl, II ................. F25B 45/00 |
| 2020/0263910 A1 | * | 8/2020 | Appler ................... F25B 45/00 |

FOREIGN PATENT DOCUMENTS

| | | | |
|---|---|---|---|
| JP | 08219598 A | * | 8/1996 |
| WO | 2010078626 A1 | | 7/2010 |

OTHER PUBLICATIONS

International Search Report for International Application No. PCT/US2019/032144; International Filing Date May 14, 2019; dated Jul. 19, 2019; 4 pages.

Nu-Calgon Product Bulletin, 3-52, A/C EasySeal, 4 pages.

Vibralign Blog, Long Live the Machine, "Mechanical Seal Basics," by Mac MacCormack on Sep. 17, 2014, 11 pages.

Written Opinion for International Application No. PCT/US2019/032144; International Filing Date May 14, 2019; dated Jul. 19, 2019; 8 pages.

* cited by examiner

FLUID MATERIAL INJECTION DEVICE

CROSS-REFERENCE TO RELATED APPLICATION

This application claims priority of provisional patent application Ser. No. 62/672,204 filed on May 16, 2018 in the name of Floyd Kent Matlack et al., and entitled "Fluid Material Injection Device and Method of Use".

BACKGROUND OF THE INVENTION

Field of the Invention

The present invention concerns a fluid material injection device for injecting a fluid material, such as a sealant liquid, into a system, such as an air conditioning or refrigeration system.

Description of Related Art

Devices for the injection of a dispensable fluid material, such as a liquid sealant, into air conditioning and refrigeration systems are known in the art. Such devices comprise a tube containing a fluid to be dispensed from the tube via a fluid outlet valve in the tube. For example, Cacciabeve et al. Published Patent Application US 2016/0178107 A1 ("Cacciabeve"), entitled "Sealant Hose and Method of Use", was published on Jun. 23, 2016. A hose 12 contains fluid sealant and is shown in FIG. 2 of Cacciabeve in an exploded view. As shown in FIG. 1, hose 12 has its inlet end connected by a refrigerant service hose (unnumbered) to an air conditioning manifold gauge 6 and its outlet end connected to the service port (SP) of an air conditioning system (AC). FIG. 3 shows an inlet valve 14 which connects the inlet end of the hose 12 to the refrigerant service hose and FIG. 4 shows an outlet valve 16 which is connected to the outlet end of the hose 12. Outlet valve 16 is seen to comprise a first housing 54 and a second housing 56 and is configured to be opened when attached to the air conditioning service port by a tapered member (not shown in the drawings) of the service port. Connection of the outlet valve 16 to the service port opens the valve so that the pressure from the air conditioning manifold gauge 6 dispenses the fluid sealant through outlet valve 16. Typically, the dispensing of a material such as a sealant liquid into a closed pressurized system utilizes the pressure difference between relatively high and low pressure zones of the closed system.

A significant problem encountered by prior art fluid material injection devices such as that of Cacciabeve is leakage of the sealant past the fluid outlet valve prior to use, for example, during manufacture, storage and/or shipment. Such leakage may occur because of failure of the valve components to fully seat against each other, or by vibration during shipment, etc. Experience has shown that contact with moisture, e.g., atmospheric humidity, by even very slight leakage past the outlet valve of, for example, a ternary silane liquid sealant, will cause the leaked sealant to polymerize and thereby effectively glue the outlet valve components together, rendering the injection device useless. Also, many rubber polymers such as silicone or buna that are normally used in the manufacture of O-rings to ensure a liquid or pneumatic seal, are highly prone to significant dimensional change caused by swelling or shrinkage when directly exposed to sealant. Such dimensional changes are deleterious as they will result in sealant leakage before use, and may jam components to hinder or prevent movement of components of the device. Either condition will render the injection device useless as will effectively "gluing" the outlet valve with polymerized sealant. An unacceptably high degree of failure of injection devices utilizing such prior art valves and O-rings at the outlet end of the device has been reported. Considerable expense is incurred by the too-frequent return and reworking of injection devices which are rendered inoperative because of leaked sealant, to say nothing of significant customer dissatisfaction. At least in the case of sealant liquids for air conditioning and refrigeration systems and the like, the sealant liquid, including any which leaks past the fluid outlet valve, must be protected from the ambient atmosphere and its moisture content.

SUMMARY OF THE INVENTION

Generally, the present invention provides a fluid material injection device (sometimes herein, "injection device") for injecting a dispensable fluid material, such as a sealant liquid or other liquid, via a service port into a closed pressurized system such as an air conditioning or refrigeration system, or the like. The injection device of the present invention overcomes the above-described problems of leakage of dispensable fluid material past the fluid outlet valve prior to use and also overcomes swelling of O-rings and the like by contact of the sealant with the O-ring prior to use. This is accomplished by providing an outlet end which is closed both by an outlet valve, which may comprise a pin-operated, e.g., Schrader, valve, and a movable contact member located downstream of the outlet valve adjacent to but sufficiently spaced from the outlet valve to prevent any leaked sealant from contacting the moveable member and its associated seals. Because the moveable contact member is located downstream of the outlet valve, the movable contact member and all associated components of the movable contact member remain segregated from sealant prior to use and "dry", that is, free of contact with any leaked sealant. The device of the present invention comprises what may be termed a "wet zone" which contains the sealant, and a "dry zone" which is not contacted by sealant until the device is used to inject sealant into the pressurized system. The establishment of such dry zone for the movable member entirely or at least very substantially eliminates the possibility of sealant polymerizing and gluing the movable member in place, thus rendering the device inoperative. It also eliminates or greatly reduces the possibility of swelling of the O-ring or other rubber components of the movable member. Either of these conditions would render the device useless. The dry, movable member, when forced into contact with the outlet valve, opens the outlet valve and releases the sealant at the time of use. Optionally, a check valve may be disposed in the movable member as described below.

Specifically, in accordance with the present invention there is provided a fluid material injection device for injecting a dispensable fluid material into a pressurized system having therein relatively high and low pressure zones of a pressurized fluid, the fluid injection device comprising the following components. A tube having an inlet end and an outlet end, the inlet end having an inlet closure member which is connectible in fluid flow communication to such high pressure zone, and the outlet end having an outlet tube connector which is connectible in fluid flow communication with such low pressure zone. The outlet tube connector defines a discharge flow path extending through the outlet tube connector to exteriorly of the device. The tube defines therewithin a closed storage chamber disposed between the inlet closure member and the outlet tube connector, the storage chamber containing a dispensable fluid material and having an outlet end closed by an outlet valve. The outlet valve is configured to be opened by being contacted by a movable member. The movable member is disposed within the discharge flow path adjacent to and spaced downstream from the outlet valve and is movable within the flow path. The movable member is configured so that upon connection of the outlet tube connector to such low pressure zone, the movable member is forced into contact with the outlet valve to open the outlet valve for discharge of the dispensable fluid material through the discharge flow path, and is further configured to permit passage of the dispensable fluid material through the discharge flow path.

Other aspects of the present invention provide one or more of the following features, alone or in any suitable combination. The movable member may further comprise a check valve passage for passage therethrough of the dispensable fluid material, and a check valve, optionally a spring-loaded check valve, disposed within the check valve passage and configured to prevent backflow from such low pressure zone into the outlet valve; the movable member may further comprise an O-ring and there is a clearance between the movable member and the outlet valve which clearance is sufficient to prevent or at least minimize the possibility of contact of the movable member and its O-ring with any dispensable fluid material which has leaked past the outlet valve; the clearance may be from about 0.02 inch (0.051 cm) to about 0.04 inch (0.102 cm); such low pressure zone is accessible via a service port of such pressurized system and the outlet tube connector may further comprise an installation member configured to secure the outlet tube connector to such service port and force the movable member into contact with the outlet valve; the installation member may comprise a threaded installation nut configured to be threaded onto such service port; the outlet valve may comprise an operating member facing the movable member and aligned therewith whereby movement of the movable member into contact with the operating member displaces the operating member to open the outlet valve; the movable member may comprise a circumferential V-groove within which is disposed an O-ring seal to prevent or at least inhibit leakage around the movable member during use of the device, and to retain the movable member in place to prevent actuation of the outlet valve caused by unintended movement of the movable member prior to use of the device; the dispensable fluid material may be a sealant fluid suitable for sealing leaks in such pressurized system; at least those portions of the device which are susceptible to contact with the dispensable fluid material prior to use of the device may be comprised of a moisture-impermeable material; at least those portions of the device which are susceptible to contact with the dispensable fluid material prior to use of the device may be comprised of one or more materials that are not subject to dimensional change by contact with the dispensable fluid material; and the inlet closure member may be configured to automatically, upon being connected to such high pressure zone, switch from a closed position to an open position.

Another aspect of the present invention provides for a fluid injection device for injecting a dispensable fluid material into a pressurized system having relatively high and low pressure zones of a pressurized fluid, the fluid injection device comprising the following components. A moisture-impermeable tube has an inlet end and an outlet end, the inlet end having an inlet closure member which is connectible in fluid flow communication to such high pressure zone, and the outlet end having an outlet tube connector which is connectible in fluid flow communication with such low pressure zone via a service port of such pressurized system; the outlet tube connector defines a discharge flow path extending therethrough to exteriorly of the device. The tube defines within it a closed storage chamber disposed between the inlet closure member and the outlet tube connector. The storage chamber contains a dispensable fluid material and has an outlet end closed by an outlet valve. The outlet valve comprises an operating pin facing the movable member and aligned therewith. The movable member is disposed within the discharge flow path adjacent to and spaced downstream from the outlet valve, and is movable within the flow path. The movable member is configured so that upon connection of the outlet tube connector to such service port, the movable member is forced into engagement with the operating pin to displace the operating pin to open the outlet valve for discharge of the dispensable fluid material through the discharge flow path. The movable member comprises a check valve passage within which is disposed a check valve which may be spring-loaded and is otherwise configured to prevent backflow from such service port into the outlet valve.

Other aspects of the invention provide one or more of the following features, alone or in any suitable combination. The device may be configured so that upon loosening or disconnection of the device from fluid flow communication with the low pressure zone of such pressurized system while the device is still connected in fluid flow communication to the high pressure zone of such pressurized system, the movable member automatically returns to its position spaced downstream from the outlet valve to thereby close the outlet valve to shut off flow through the device of the dispensable fluid material; the dispensable fluid material may comprise a liquid sealant suitable for sealing leaks in such pressurized system; the outlet tube connector may further comprise a threaded installation nut configured to be threaded onto such service port whereby the movable member is urged by movement of the installation nut onto such service port to displace the operating pin whereby to open the outlet valve; and the inlet closure member and the outlet valve may each comprise a Schrader valve, the Schrader valve of the inlet closure member being configured to automatically open upon being connected to such high pressure zone.

As used herein, the term "dispensable fluid material" is intended to encompass flowable, non-gaseous materials such as liquids, including liquid polymers and liquid polymer precursors, liquids with fine particulate solids suspended therein, colloidal suspensions, flowable gels and, in general, flowable non-gaseous materials, and mixtures of two or more thereof. Gases are excluded from the definition.

As used herein, a "downstream" or "upstream" location or structure is as sensed relative to the direction of dispensable fluid material being discharged from the device.

DETAILED DESCRIPTION OF THE INVENTION AND SPECIFIC EMBODIMENTS THEREOF

For economy of expression, in the following discussion reference is sometimes made to a "sealant liquid" suitable for sealing leaks in a closed pressurized system, as a specific dispensable fluid material. The present invention, however, encompasses a device and method for injecting other types of dispensable fluid materials into a pressurized system.

Figure 1:
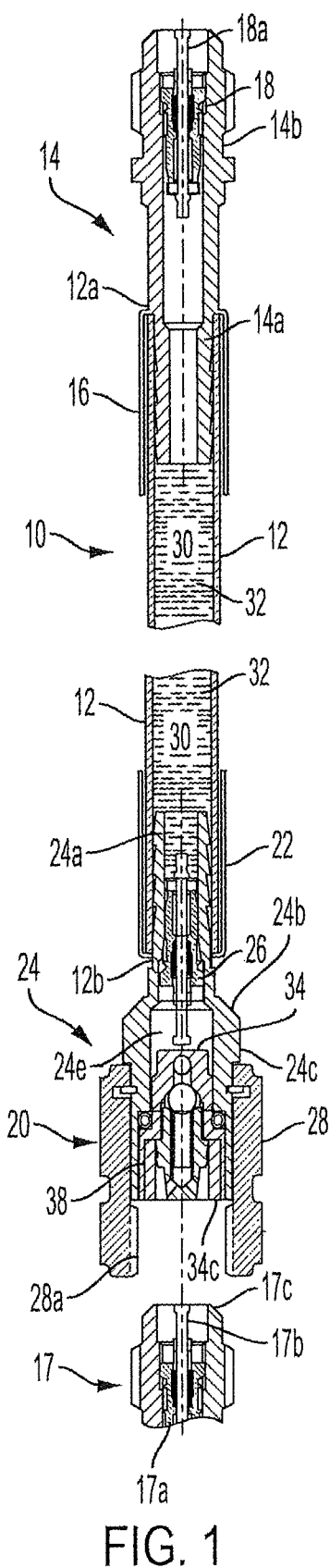
FIG. 1 is a cross-sectional view in elevation of one embodiment of the injection device of the present invention, with the outlet end of the device comprising a connector assembly disposed adjacent to, but not connected to, a service port (shown broken-away) of a pressurized closed system.
Figure 1A:
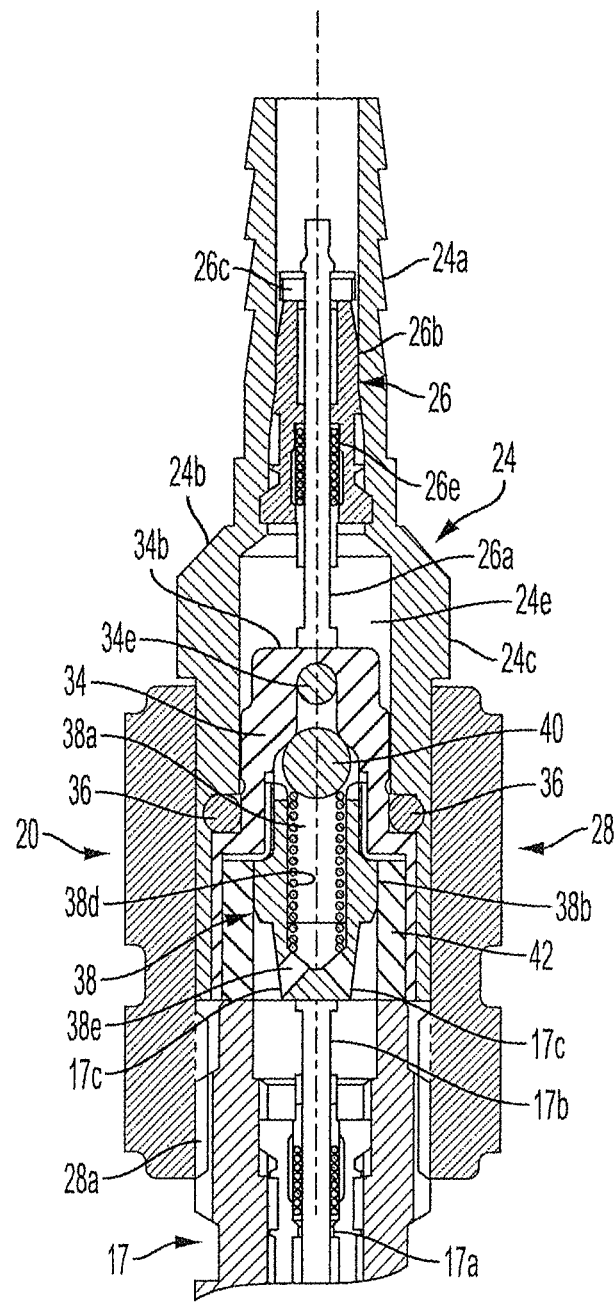
FIG. 1A is a cross-sectional view in elevation, enlarged relative to FIG. 1, of the connector assembly of the device of FIG. 1 connected to the service port (shown broken-away) of FIG. 1.

Referring now to FIG. 1, there is shown a fluid material injection device 10 comprised of a tube 12 having an inlet end 12a and an opposite outlet end 12b. The tube 12 may be a moisture-impermeable tube, and may be made of a material that does not swell, shrink or otherwise change dimensionally when exposed to sealant or other dispensable fluid materials. The tube may, for example, be a polyvinyldifluoride such as that sold under the trademark Kynar by Arkema, Inc., or it may be any other suitable material. The tube is conveniently designed to withstand the highest pressure to which it will be subjected when attached to the closed pressurized system, e.g., the refrigerant lines of any standard air conditioning, refrigeration or the like system. Alternatively, the tube may be provided in different strengths to withstand, without bursting, the highest pressure which will be encountered in a given type of system. Preferably, the tube is made with sufficient bursting strength to resist the highest pressure it will encounter in any standard air conditioning, refrigeration or the like system so that only a single part need be kept in inventory. Inlet end 12a has an inlet closure member 14 secured thereto by a first crimp sleeve 16. Inlet closure member 14 contains a suitable inlet valve, such as a Schrader inlet valve 18. Tube 12 is configured to define therein a storage chamber 30 within which a dispensable fluid material 32 is contained. The device 10 may of course be made of any suitable size. The size may vary depending on how large a dose of dispensable fluid material is to be injected into the pressurized system. For example, usually a dose of sealant is smaller than a dose of an acid scavenger, so a fluid injection device containing sealant may be smaller (e.g., shorter in length) than a fluid injection device for injecting an acid scavenger into the system. Typically, the overall length of the fluid injection device may vary from about 3.25 inches (8.26 cm) to about 6.5 inches (16.51 cm). As shown in FIGS. 1 and 1A, a service port 17 of a pressurized closed system (not shown) contains the usual service port Schrader valve 17a having an operating pin 17b which, when depressed, will open the service port Schrader valve.

Inlet closure member 14 has a bore (unnumbered) extending therethrough and is secured to inlet end 12a of tube 12 by an exteriorly-barbed end section 14a of inlet closure member 14. End section 14a is received within the inlet end 12a of tube 12 and secured in place by the first crimp sleeve 16. Inlet closure member 14 has a base section 14b which serves as a housing for the Schrader inlet valve 18. Valve 18 serves to close the inlet end 12a of tube 12 to prevent leakage of dispensable fluid material from storage chamber 30 prior to use of injection device 10. The inlet closure member 14 connects the inlet end either directly or indirectly via a connector hose to a high pressure zone of the pressurized closed system, and the outlet connector connects the injection device to a low pressure zone of the pressurized closed system via a service port. Upon the inlet end being connected to the high pressure zone, the inlet closure member preferably is opened automatically, e.g., by mechanical contact, or by the pressure in the high pressure zone. Mechanical contact is the preferred mechanism for opening the inlet valve, usually a Schrader valve, as mechanical contact usually imposes higher pressure and is therefore more reliable than the pressure of the high pressure zone alone, particularly if some sealant has polymerized on the inlet Schrader valve.

Outlet end 12b has a connector assembly 20 secured thereto by a second crimp sleeve 22. Connector assembly 20 is secured to outlet end 12b of tube 12 by an outlet tube connector 24 which has a barbed end section 24a which is received within the outlet end 12b of tube 12 and secured in place by the second crimp sleeve 22. Outlet tube connector 24 has a passageway 24e extending therethrough, an outwardly flared transition section 24b extending between barbed end section 24a and a guide section 24c. Guide section 24c is of enlarged diameter relative to end section 24a. A threaded installation nut 28 is rotatably mounted on the guide section 24c of outlet tube connector 24. Installation nut 28 is internally threaded by threads 28a (FIGS. 1A and 2) or otherwise configured to permit attachment of installation nut 28 to a service port, such as service port 17, located in a low pressure zone of a pressurized closed system.

Figures 2, 2A:
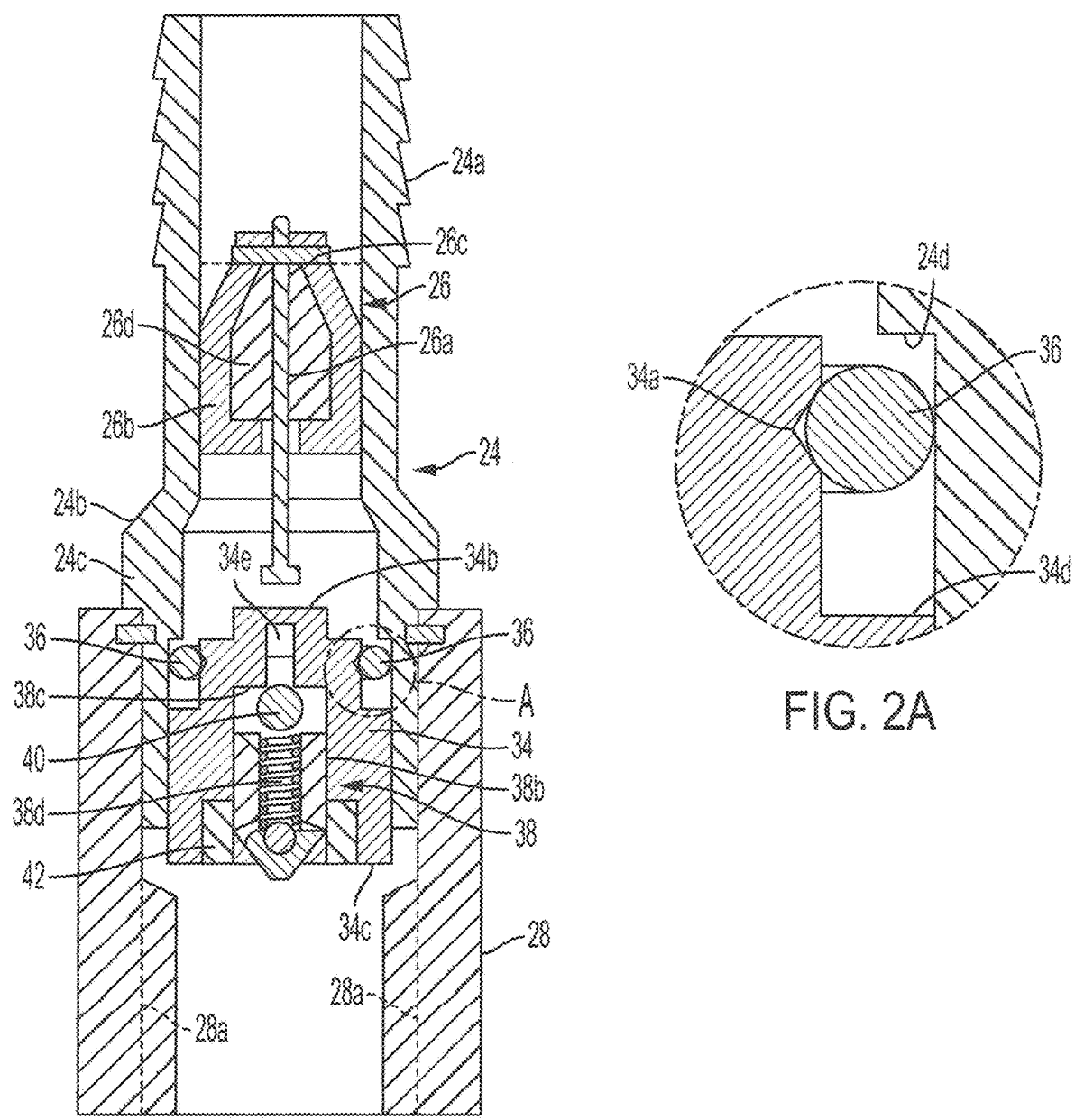
FIG. 2 is a schematic cross-sectional view, enlarged relative to FIG. 1A, of the connector assembly of FIG. 1A shown with the movable contact member not in contact with the outlet valve.
FIG. 2A is a view, enlarged relative to FIG. 2, of the portion of FIG. 2 contained within the circle A.

Referring now to FIGS. 1A, 2 and 2A, barbed end section 24a serves as a housing for an outlet valve 26 of the type sold under the trademark SCHRADER®. Such valves, sometimes herein referred to as "Schrader" valves, comprise the usual operating member, in this case a coil spring (26e)-loaded operating pin 26a, and a valve body 26b. Valve 26 has a release port 26c (FIGS. 1A and 2) operated by operating pin 26a in the usual manner between open and closed positions, and a passage 26d (FIG. 2) formed in valve body 26b. Guide section 24c serves as a housing for a movable member 34, which is movable longitudinally within guide section 24c. Movable member 34 is held in place within the passage (unnumbered) of outlet tube connector 24 by an O-ring 36 (FIGS. 1A and 2) as more fully described below, and has a circumferential external V-groove 34a (FIG. 2A), a contact surface 34b and a seating surface 34c (FIG. 2).

Referring to FIGS. 1A and 2, a passage 34e is formed in movable member 34. Movable member 34 serves as a housing for a check valve 38 comprising a ball 40 held in place within check valve body 38b by a coil spring 38d which serves to force ball 40 against a valve shoulder 38c (FIG. 2) in order to close check valve passage 38a and passage exits 38e against backflow from the pressurized system to which, in use, the outlet end of injection device 10 is connected. This prevents fluid material 32 from being pressurized by backflow of pressurized fluid in the closed pressurized system to which the injection device 10 is connected. In use, the check valve coil spring 38d is engineered to collapse and allow the ball 40 to unseat from the valve shoulder 38c and permit the flow of dispensable fluid material 32 when the ball 40 is exposed to upstream pressure of greater than 10-30 PSIA. In addition to causing failure of the injection device, such backflow poses a safety issue for the user while mounting device 10 to, or disconnecting device 10 from, the service port 17.

In the illustrated embodiment, check valve 38 is the point of contact with the operating pin 17b of service port 17 and opens the service port Schrader valve 17a when the device 10 is mounted to the system low pressure service port 17. The check valve 38 is mounted, e.g., threadably, for selected movement along the longitudinal axis of movable member 34 (vertically up and down as viewed in FIGS. 1A, 2 and 3) so that the effective length of the assembly of movable member 34 and check valve 38 may be adjusted by the user. Making such an effective length adjustment of prior art fixed connector structures is known, and is used to accommodate service ports in which the Schrader valve 17a of the service port 17 is over- or under-tightened so that the point of contact for opening the service port Schrader valve 17a is either too deep or too shallow. Conventionally, the effective depth of the system's Schrader valve 17a is adjusted by the user by screwing the threaded Schrader valve 17a in or out of the service port in which case the adjustment piece may be any suitable threaded or otherwise adjustable structure. Adjustment may be effectuated by a needle-nose pliers or comparable tool. In the illustrated embodiment of the present invention, further adjustment may be obtained using the same type of tool and by configuring the check valve body 38b to be longitudinally movable within movable member 34. This adjustable feature allows the user to compensate for variations in the position of the Schrader valve operating pin 17b and thus permits positive engagement with the Schrader valve 17a. This prior art expedient is not to be confused with a novel feature of the present invention which disposes the movable member 34 adjacent to but spaced downstream from outlet valve 26 and therefore away from exposure to leaked sealant prior to use of the device 10. The distance by which movable member 34 is disposed downstream of outlet valve 26 is sometimes herein and in the claims referred to as the "clearance" between the movable member 34 and the outlet valve 26. More specifically, in the illustrated embodiment, the clearance is the distance between the operating member (the operating pin 26a) of outlet valve 26 and the contact surface 34b of movable member 34. Contact surface 34b will contact the operating pin 26a when the movable member is forced into contact with the operating pin. FIG. 2 shows this clearance as the gap between the head (unnumbered) of operating pin 26a and the contact surface 34b of movable member 34. This gap (the clearance) separates the "wet zone" of device 10 from the "dry zone". The wet zone is that portion of the device located above (as viewed in FIG. 2) the gap, and the dry zone is that portion of the device located below the gap. As seen in FIG. 2, the movable member 34, its O-ring 36 and its check valve 38 are all located in the dry zone so as to avoid or at least greatly minimize the chance of contact of these components with the dispensable fluid material, including any of the dispensable fluid material which may leak around the release port 26c of outlet valve 26. The gap, or clearance, may measure from about 0.02 inch (0.051 cm) to about 0.04 inch (0.102 cm), for example, from 0.028 inch (0.071 cm) to about 0.038 inch (0.097 cm). The present invention provides for the movable member 34 to be urged into contact with outlet valve 26, more specifically in the illustrated embodiment, into contact with operating pin 26a in order to open outlet valve 26. In the illustrated embodiment, the force to move movable member 34 into contact with outlet valve 26 is provided, as described elsewhere herein, by tightening threaded installation nut 28 onto service port 17 so that shoulder 17c of service port 17 moves movable member 34 upwardly.

Referring now to FIG. 2A, the V-groove 34a is provided on the outer circumference of movable member 34. The V-groove 34a establishes a resting location for the O-ring 36 to prevent unintended movement or loss of the movable member 34 before use, e.g., when the tube assembly is in storage or transport. Such unintended movement could potentially result in contact of contact surface 34b of movable member 34 with the operating pin 26a to prematurely open the outlet valve 26. The O-ring 36 also acts as a seal to close a potential leakage path around movable member 34. Such leakage may be of any fluid material 32 leaking from storage chamber 30, or backflow from pressurized fluid, e.g., refrigerant, in the pressurized system, when the injection device is in use.

Figure 3:
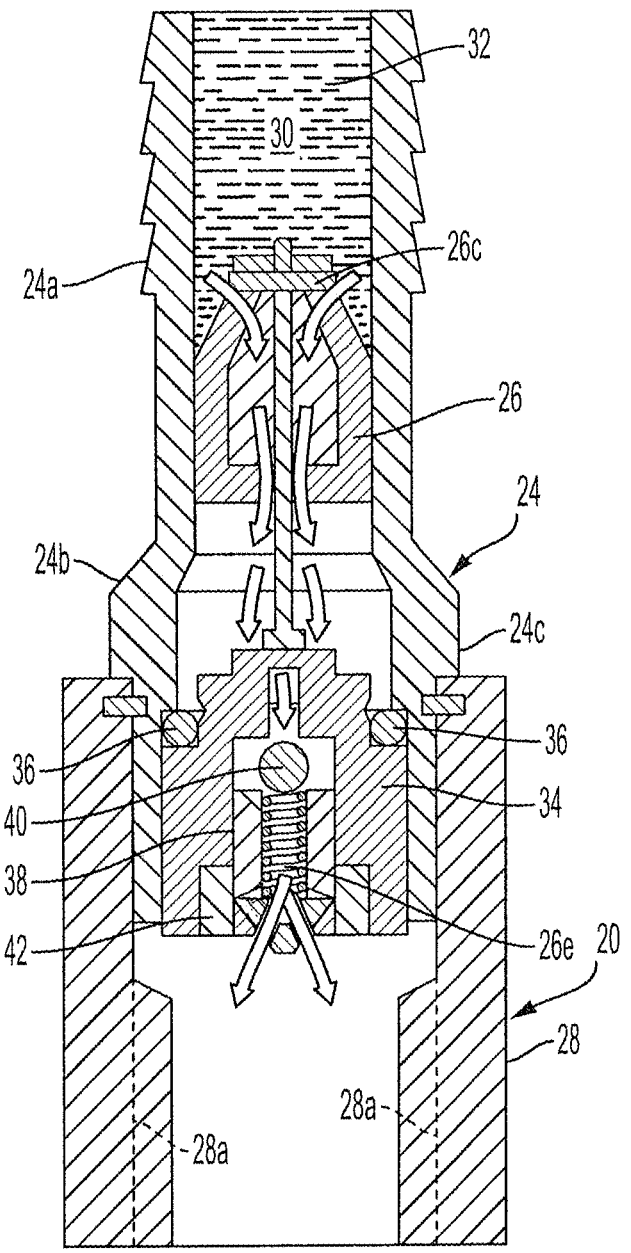
FIG. 3 is a view of the connector assembly of FIG. 2 shown with the movable contact member in contact with the outlet valve to hold the outlet valve in the open position.

Referring to FIGS. 2 and 3, a ring seal 42 is disposed between valve body 38b and the seating surface 34c of movable member 34. Ring seal 42 acts as a seal to close a potential leak path for sealant liquid and pressurized refrigerant at the interface of the injection device 10 and the service port of the closed system to which the outlet end of the injection device is connected. The seating surface 34c provides a positive point of contact with the shoulder 17c of the service port 17 (FIGS. 1 and 1A) when the tube assembly is screwed onto the refrigerant line service port by means of the installation nut 28. As the installation nut 28 is threaded onto the refrigerant line service port 17, the movable member 34 is moved towards the operating pin 26a of outlet valve 26, so that contact surface 34b contacts operating pin 26a and moves it (upwardly as viewed in FIGS. 1 and 1A, i.e., towards inlet end 12a) to open release port 26c of outlet valve 26. Opening release port 26c allows the dispensable fluid material, e.g., the liquid sealant, to flow from the storage chamber 30 through the outlet valve 26, check valve 38 and service port Schrader valve 17a, thence into the pressurized closed system, e.g., the refrigerant lines of an air conditioning or refrigeration system. The liquid sealant is dispensed by the pressurized fluid entering the inlet valve 18.

In use, the inlet closure member may be connected to a relatively high pressure zone of the closed system, e.g., by means of a standard service manifold set and refrigerant hoses. The outlet tube connector may be connected directly to a relatively low pressure zone of the system, e.g., a service port such as service port 17. The pressure difference between the two connection points propels the fluid material from the device into the closed system. Alternatively, a pressurized injection gas could be supplied to the inlet end of the device from other sources, such as a cylinder of a pressurized refrigerant gas.

As the installation nut 28 is screwed onto the service port 17 of the pressurized closed system, the movable member 34 is forced towards operating pin 26a by contact with shoulder 17c (FIGS. 1 and 1A) of service port 17. The resulting movement of member 34 will cause the O-ring 36 to move out of the V-groove 34a, causing the O-ring 36 to be compressed between the exterior sidewalls (unnumbered) of the movable member 34 and the interior wall (unnumbered) of guide section 24c of outlet tube connector 24. This compression results in creating a more positive seal between the surfaces of those two components. The seal is further enhanced as the movable member 34 completes its movement and causes the O-ring 36 (FIG. 2A) to be compressed between shoulder 34d and shoulder 24d (FIG. 2A), to enhance the strength of the seal.

In addition to actuating operating pin 26a, movable member 34 serves as an active safety shut-off for the injection device 10, thereby enhancing user safety. In use, if the installation nut 28 is unscrewed and removed or even partially backed off from the refrigerant service port 17, i.e., loosened, the pressure imposed on movable member 34 by shoulder 17c of service port 17 (FIGS. 1 and 1A), which pressure urges movable member 34 towards outlet valve 26, is released. Consequently, the movable member 34 is immediately returned to its original position out of contact with operating pin 26a by the upstream pressure of flow of the dispensable fluid material. This is shown in FIG. 1 and described below. As a result, the contact surface 34b of member 34 no longer pushes against the operating pin 26a to open the release port 26c. This causes the operating pin 26a to return to its original closed position under influence of outlet valve coiled spring 26e of the Schrader outlet valve 26, thereby closing the release port 26c to very rapidly, substantially immediately, stop the flow of fluid material 32. This safety feature prevents unintended release of pressurized fluid material 32 even if the installation nut 28 were to be loosened or unscrewed from the refrigeration service port 17 while the injection device 10 is fully pressurized from inlet end 12a by the high pressure zone of the pressurized closed system. This return of member 34 to its original position out of contact with operating pin 26a upon removal or loosening of installation nut 28 results from the coil spring 26e of the Schrader outlet valve 26 exerting pressure on operating pin 26a to force the movable member 34 back to its original position. If there is pressure in storage chamber 30 when installation nut 28 is loosened or unscrewed, the resulting brief flow of pressurized fluid material 32 towards movable member 34 speeds movement of movable member 34 away from pin 26a to close Schrader outlet valve 26. Closure of outlet valve 26 happens in less than a second under such circumstances, thereby providing an excellent safety feature for the user and also prevents unintended release of refrigerant gas to the atmosphere.

It is seen that in use movable member 34 and check valve 38 are not exposed to sealant liquid (fluid material 32) until the injection device 10 is mounted onto the pressurized closed system's service port 17 by means of the installation nut 28. By preventing or greatly reducing contact of fluid material 32 with the movable member 34 and check valve 38, the danger of fluid material 32 polymerizing or otherwise causing a malfunction of the injection device is prevented or at least greatly reduced. If, despite the described precaution, there should occur before use any leakage of fluid material 32 at the outlet valve 26 through release port 26c or otherwise, or if for any reason the fluid material 32 polymerizes or otherwise forms a solid bond at the release port 26c or elsewhere on outlet valve 26, the mechanical forces developed by screwing the installation nut 28 onto the service port 17, will provide sufficient mechanical force to the movable member 34 to break the polymer or other bond and allow the sealant liquid to properly flow as intended. The installation nut 28 may be threaded with the standard 7/16" 20 UNF-2B thread that is used on refrigerant line service ports, and is machined with a thread depth sufficient to ensure that the movable member 34 is held in place so as to be fully engaged with the shoulder 17c of the service port 17.

Tube 12 is preferably comprised of a moisture-impermeable material and may be transparent or translucent, or at least may have a transparent or translucent section, to enable a user to see the dispensable fluid material 32 contained within storage chamber 30, and to observe the transport of such dispensable fluid through tube 12 for discharge from the outlet valve 26.

The moisture impermeability of tube 12 enables the tube to be used with dispensable fluids which are highly reactive with water. For example, one suitable and commercially available liquid sealant comprises a ternary silane which is highly reactive with moisture and which, when in contact with moisture, will within a few hours polymerize to form a solid. It is therefore important to maintain such dispensable sealant liquids isolated from contact with moisture until the sealant liquid is dispensed into the air conditioning or refrigeration closed system to fill any pin-point openings in the system refrigerant lines. As the sealant liquid is dispersed throughout the closed system refrigerant lines, any such openings are contacted by the sealant, which plugs the leaks by reacting with moisture, such as atmospheric humidity or water condensate present at the exteriors of the pin-point openings, to polymerize and seal the site or sites of the leaks.

In use, inlet closure member 14 is secured to a high pressure zone of a pressurized system being treated, for example, to the high side service port (not shown) by means of refrigeration service hoses and a service manifold set (not shown). Installation nut 28 is secured to service port 17 located on the low pressure side of the pressurized closed system, such as an air conditioning or refrigeration closed system to be treated. The Schrader inlet valve 18 contained within inlet closure member 14 is opened by mechanical pressure imposed on operating pin 18a (FIG. 1) by connection of inlet closure member 14 to refrigeration service hoses and a service manifold set (not shown). A conventional valve on the manifold set is opened so that the pressurized fluid, e.g., refrigerant, in the high pressure zone forces the dispensable fluid material 32, e.g., a liquid sealant, out of storage chamber 30, thence through outlet valve 26, movable member 34, check valve 38 and, via service port 17, into a low pressure zone of the closed system. When the liquid sealant has been discharged, the valve on the manifold set may be closed and the device disconnected from the system.

The unnumbered arrows in FIG. 3 show the flow path of dispensable fluid material 32, e.g., liquid sealant, from storage chamber 30 through connector assembly 20 into a service port (not shown in FIG. 3) under the influence of a pressurized fluid. The pressurized fluid may be, e.g., pressurized refrigerant in an air conditioning or refrigeration system or the like, and enters storage chamber 30 through inlet valve 18 (not shown in FIG. 3). The flow path is from chamber 30, thence through opened release port 26c of outlet valve 26, into movable member 34 via a passage 34e (FIGS. 1A and 2), then into check valve 38 and via a check valve passage 38a (FIG. 1A) into the service port 17 (shown in FIGS. 1 and 1A, not shown in FIG. 3).

Any leakage of the dispensable fluid past the outlet valve prior to use may cause atmospheric moisture or any other problematic component of the ambient air or atmosphere to react with the dispensable fluid material and polymerize it. Such occurrence would cause prior art injection devices to be rendered ineffective as discussed above. But in the case of the present invention, the mechanical force imposed on the movable member (e.g., movable member 34) by securing the installation nut (e.g., installation nut 28) to the service port (e.g., service port 17) is great enough to rupture the polymerized material, thus restoring the injection device to an operative condition.

While the invention has been described in detail with reference to specific embodiments, it will be appreciated that numerous variations may be made to the described embodiments, which variations nonetheless lie within the scope of the present invention and the claims.

What is claimed is:

1. A fluid injection device for injecting a dispensable fluid material into a pressurized system having therein relatively high and low pressure zones of a pressurized fluid, the fluid injection device comprising:
   a tube having an inlet end and an outlet end, the inlet end having an inlet closure member which is connectible in fluid flow communication to such high pressure zone, and the outlet end having a connector assembly comprising an outlet tube connector which is connectible in fluid flow communication with such low pressure zone, the outlet tube connector defining a discharge flow path extending therethrough to exteriorly of the device;
   the tube defining therewithin a closed storage chamber disposed between the inlet closure member and the outlet tube connector, the storage chamber containing a dispensable fluid material and having an outlet end closed by an outlet valve, the outlet valve being configured to be opened by being contacted by a movable member which is mounted for movement within the connector assembly and is
   disposed within the discharge flow path in a spaced position adjacent to and spaced downstream from the outlet valve, whereby to provide clearance between the movable member and the outlet valve; and
   the movable member being configured (a) to permit passage of the dispensable fluid material through the discharge flow path, and (b) so that upon connection of the outlet tube connector to such low pressure zone, the movable member is forced from the spaced position into contact with the outlet valve to open the outlet valve for discharge of the dispensable fluid material through the discharge flow path.

2. The device of claim 1 wherein the movable member further comprises a check valve passage for passage therethrough of the dispensable fluid material, and a check valve disposed within the check valve passage and configured to prevent backflow from such low pressure zone into the outlet valve.

3. The device of claim 2 wherein the movable member further comprises an O-ring and the clearance between the movable member and the outlet valve serves to space the movable member and its O-ring from any dispensable fluid material which has leaked past the outlet valve.

4. The device of claim 1, claim 2 or claim 3 wherein the clearance is from about 0.02 inch (0.051 cm) to about 0.04 inch (0.102 cm).

5. The device of claim 1 wherein such low pressure zone is accessible via a service port of such pressurized system and the connector assembly further comprises an installation member configured to secure the outlet tube connector to such service port and thereby force the movable member from the spaced position into said contact with the outlet valve.

6. The device of claim 5 wherein the installation member comprises a threaded installation nut configured to be threaded onto such service port.

7. The device of claim 1, claim 2 or claim 3 wherein the outlet valve comprises an operating member facing the movable member and aligned therewith whereby movement of the movable member into contact with the operating member displaces the operating member to open the outlet valve.

8. The device of claim 1 or claim 2, wherein the movable member comprises a circumferential V-groove within which is disposed an O-ring seal to prevent or at least inhibit leakage around the movable member during use of the device, and to retain the movable member in place to prevent actuation of the outlet valve caused by unintended movement of the movable member prior to use of the device.

9. The device of any one of claim 1, 2 or 3 wherein the dispensable fluid material is a sealant fluid for sealing leaks in such pressurized system.

10. The device of any one of claim 1, 2, 3 or 5 wherein at least those portions of the device which are in contact with the dispensable fluid material prior to use of the device are comprised of one or more moisture-impermeable materials.

11. The device of any one of claim 1, 2, 3 or 5 wherein at least those portions of the device which are in contact with the dispensable fluid material prior to use of the device are comprised of one or more materials that are not subject to dimensional change by contact with the dispensable fluid material.

12. The device of claim 1 or claim 2 wherein the inlet closure member is configured to automatically, upon being connected to such high pressure zone, switch from a closed position to an open position.

13. A fluid injection device for injecting a dispensable fluid material into a pressurized system having relatively high and low pressure zones of a pressurized fluid, the fluid injection device comprising:
   a moisture-impermeable tube having an inlet end and an outlet end, the inlet end having an inlet closure member which is connectible in fluid flow communication to such high pressure zone, and the outlet end having a connector assembly comprising an outlet tube connector which is connectible in fluid flow communication with such low pressure zone via a service port of such pressurized system, the outlet tube connector defining a discharge flow path extending therethrough to exteriorly of the device;
   the tube defining therewithin a closed storage chamber disposed between the inlet closure member and the outlet tube connector, the storage chamber containing a dispensable fluid material and having an outlet end closed by an outlet valve, the outlet valve comprising an operating pin facing a movable member disposed within the connector assembly and aligned with the operating pin;
   the movable member being disposed within the discharge flow path in a spaced position adjacent to and spaced from the outlet valve and being movable along a portion of the flow path within the connector assembly, the movable member being configured so that upon connection of the connector assembly to such service port, the movable member is forced from the spaced position into engagement with the operating pin to displace the operating pin to open the outlet valve for discharge of the dispensable fluid material through the discharge flow path; and
   the movable member comprising a check valve passage within which is disposed a check valve configured to prevent backflow from such service port into the outlet valve.

14. The device of claim 13 wherein the check valve is spring-loaded.

15. The device of claim 13 wherein upon loosening or disconnection of the device from fluid flow communication with the low pressure zone of such pressurized system while the device is still connected in fluid flow communication to the high pressure zone of such pressurized system, the movable member is configured to automatically be returned to the spaced position by pressure in the high pressure zone to thereby close the outlet valve to shut off flow of the dispensable fluid material through the device.

16. The device of claim 13 wherein the dispensable fluid material comprises a liquid sealant suitable for sealing leaks in such pressurized system.

17. The device of any one of claim 13, 14 or 15 wherein the connector assembly further comprises a threaded installation nut configured to be threaded onto such service port whereby the movable member is urged by movement of the installation nut relative to such service port to cause such service port to displace the movable member from the spaced position and into contact with the operating pin of the outlet valve, whereby to open the outlet valve.

18. The device of any one of claim 13, 14 or 15 wherein the inlet closure member and the outlet valve each comprise a Schrader valve, the Schrader valve of the inlet closure member being configured to automatically open upon being connected to such high pressure zone.

\* \* \* \* \*